United States Patent [19]
Jellinek

[11] 3,747,717
[45] July 24, 1973

[54] VEHICLE HAVING PLURAL MODES OF PROPULSION

[76] Inventor: John Jellinek, 21900 Drexel Dr., Mount Clemens, Mich. 48043

[22] Filed: Jan. 12, 1971

[21] Appl. No.: 105,794

[52] U.S. Cl. .................................. 180/6.5, 180/8 R
[51] Int. Cl. ............................................ B62d 57/02
[58] Field of Search ..................... 180/6.2, 6.5, 8 R, 180/6.48; 115/1 R

[56] References Cited
UNITED STATES PATENTS

| | | | |
|---|---|---|---|
| 2,787,331 | 4/1957 | LeTourneau et al. | 180/6.5 |
| 3,057,319 | 10/1962 | Wagner | 180/8 R X |
| 3,109,506 | 11/1963 | Schroter et al. | 180/8 R |
| 3,208,544 | 9/1965 | Colvin | 180/8 R X |
| 3,316,992 | 5/1967 | Schindler | 180/6.2 |
| 3,348,518 | 10/1967 | Forsyth et al. | 115/1 R |
| 3,372,766 | 3/1968 | Lifferth | 180/6.48 |

Primary Examiner—Leo Friaglia
Attorney—Birch, Swindler, McKie & Beckett

[57] ABSTRACT

A vehicle having walking, rolling and combination walking-rolling modes of propulsion. The means for propelling the vehicle in the walking mode include a plurality of axles mounted for rotation through 360°. An arm is connected to each end of each axle and a wheel is attached to the outer end of each arm. A drive means is connected to the axles for rotating the arms and wheels about the axes of the associated axles. The means for propelling the vehicle in the rolling mode include a plurality of independently operable drive means drivingly connected to the wheels for rotating the wheels about their own axes. The drive means for the axles and wheels may be operated simultaneously to propel the vehicle in the combination walking-rolling mode.

7 Claims, 5 Drawing Figures

INVENTORS
JOHN JELLINEK

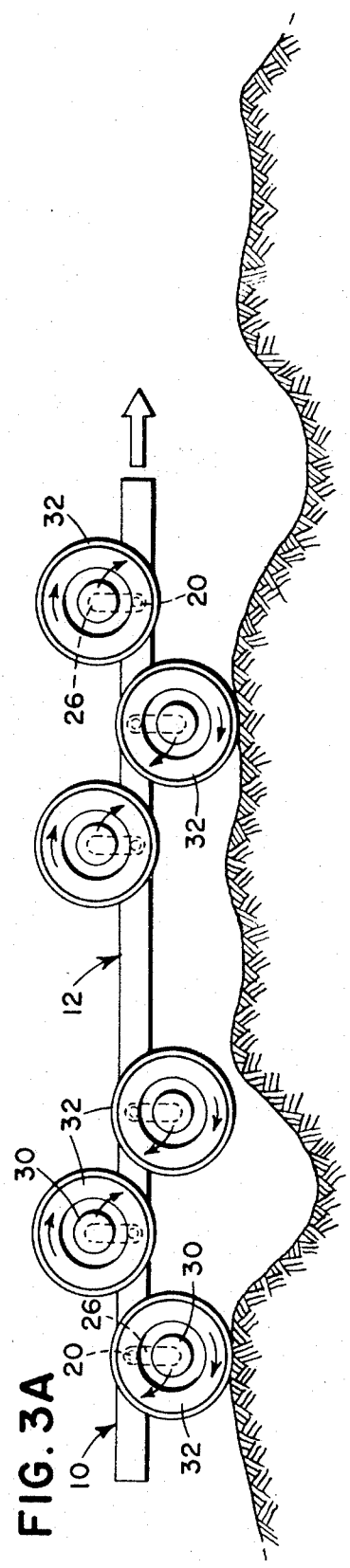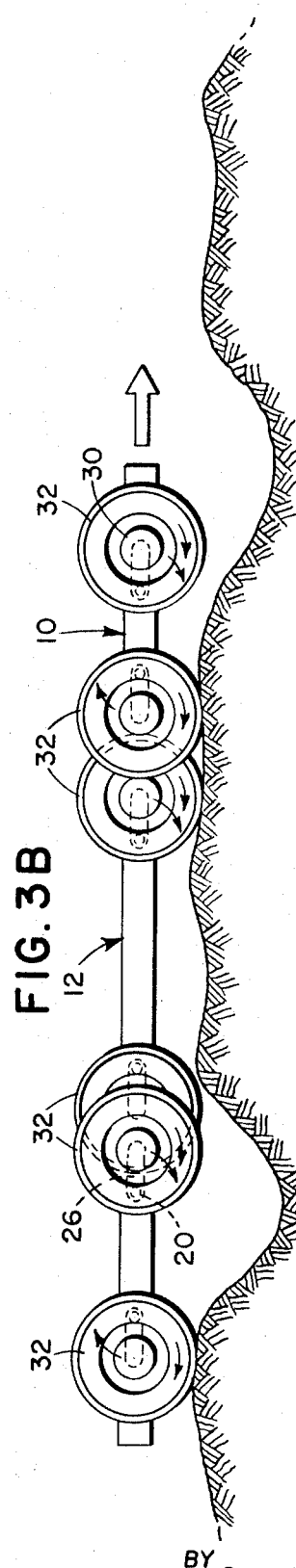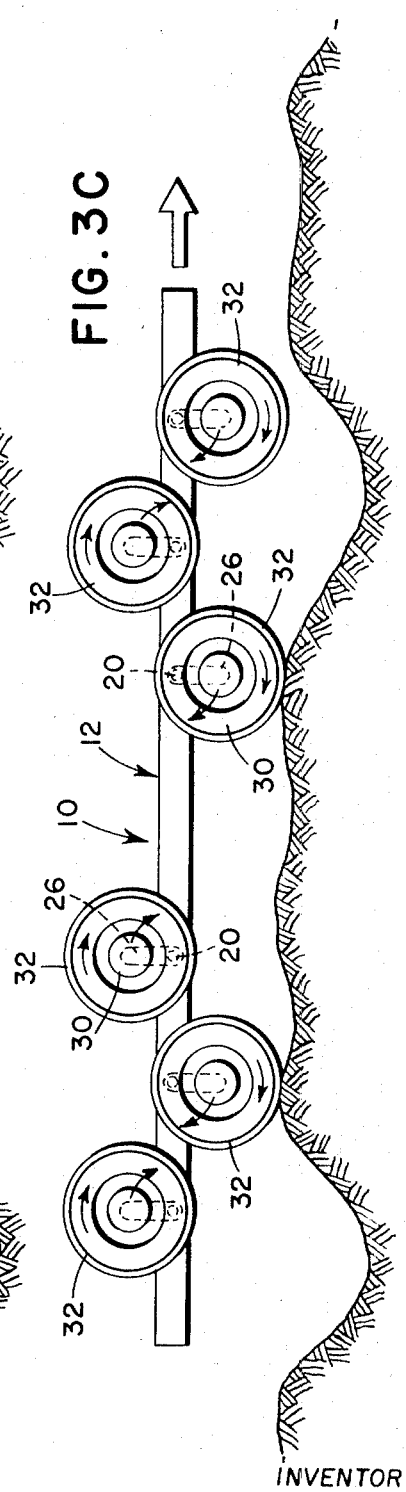

VEHICLE HAVING PLURAL MODES OF PROPULSION

BACKGROUND OF THE INVENTION

1. Field of the Invention

This invention relates to vehicles having plural modes of propulsion, and specifically, to a vehicle having walking, rolling and combination walking-rolling modes of propulsion.

2. Description of the Prior Art

Vehicles having a walking mode of propulsion are known, as exemplified by Schroter et al. U.S. Pat. No. 3,109,506. The prior art walker-type vehicles generally include a plurality of rotatably mounted arms each of which has a wheel rotatably mounted at the outer end thereof. a hydraulic piston and cylinder mechanism is operatively connected to and reciprocates such arms through a predetermined arc. As the arms are reciprocated, the wheels engage the ground during a rearward propulsion stroke and a forward return stroke. The arrangement requires that a complicated drive mechanism be provided for decreasing the rotational speed of the wheels during the propulsion stroke and increasing the rotational speed of the wheels during the return stroke, otherwise the wheels will slip and lose traction. Such a drive mechanism is expensive to manufacture and maintain. Thus, while walker-type vehicles provide an advantageous means for traversing rough terrain, the prior art vehicles of this type have not been practical or economically attractive.

In addition, the prior art walker-type vehicles generally have employed hydraulic drive means for reciprocating the arms on which the wheels are mounted and for driving the wheels themselves. Drive means of this type are unsatisfactory for use in environments having extreme temperature differentials, such as on the lunar surface. In an environment such as this, the hydraulic fluid will vaporize at high temperatures and congeal at low temperatures.

SUMMARY OF THE INVENTION

The vehicle of the present invention largely obviates the foregoing problems and is specifically designed for use in environments having extreme temperature differentials, such as on the lunar surface. Basically described, the vehicle of the invention comprises; a frame; a plurality of rotatable drive units mounted on the frame, each of said units being rotatable through 360° and having one end disposed on one side of the frame and the other end disposed on the opposite side of the frame; a first drive means mounted on the frame and drivingly connected to the drive units for rotatably driving said units through 360°; a pair of arms connected to each of the drive units with one of the arms of each of said arm pairs being connected to each end of the associated drive unit; a support connected to each of the arms outwardly from the connection of each of the arms to the associated drive unit; a plurality of ground-engaging means, one of said ground-engaging means being rotatably mounted on each of the supports; and a plurality of independently operable second drive means, one of said second drive means being drivingly connected to each of the ground-engaging means, whereby the vehicle may be propelled in a walking mode by the operation of the first drive means, in a rolling mode by the operation of the second drive means and in a combination walking-rolling mode by the operation of the first and second drive means.

Each of the drive units preferably comprises an axle, and each of the ground-engaging means preferably comprises a wheel. The drive means preferably comprise electric motor and mechanical elements which connect the motors to the drive units and ground-engaging means. Moreover, the vehicle is a compact, rugged and relatively light weight structure which is ideally suited for transport in a space vehicle and use on the lunar surface.

With the foregoing in mind, it is an object of the present invention to provide an improved vehicle having plural modes of propulsion.

It is also an object of the invention to provide an improved vehicle which may be propelled in a walking mode, a rolling mode or a combination walking-rolling mode.

It is an additional object of the invention to provide a walker-type vehicle in which the drive means that provide the walking mode of propulsion are rotated through 360° during each walking cycle.

It is a further object of the invention to provide a vehicle having plural modes of propulsion which is particularly adapted for use in environments having extreme temperature differentials.

It is another object of the invention to provide a vehicle having plural modes of propulsion which is compact, rugged and relatively light weight.

These and other objects of the invention will become apparent upon a consideration of the following detailed description thereof given in conjunction with the following drawings, wherein like reference numerals identify like elements throughout.

BRIEF DESCRIPTION OF THE DRAWINGS

FIGS. 3A – 3C are schematic elevational views showing the operation of the vehicle of the invention.

DESCRIPTION OF THE PREFERRED EMBODIMENT

Figure 1:
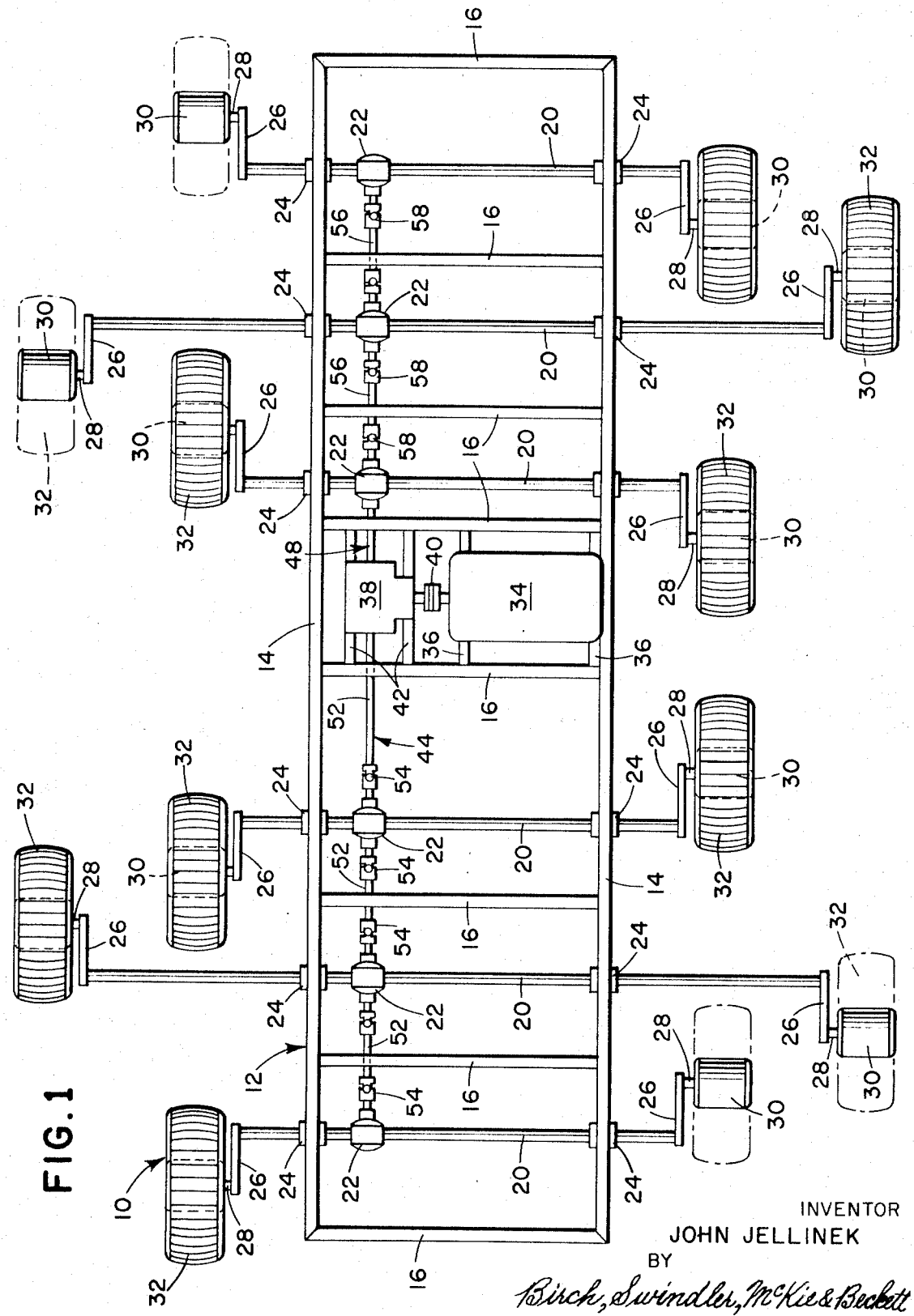
FIG. 1 is a plan view of the frame, drive means and drive units of the vehicle of the invention.

A preferred embodiment of the vehicle of the invention is shown in the drawings, as indicated by reference numeral 10. Vehicle 10 includes a frame 12 comprising a pair of longitudinally extending members 14 and a plurality of transversely extending members 16. Frame members 14 and 16 may be interconnected in any conventional manner, as by welding. Also, the frame members preferably are made from a structural material adapted for the particular use for which the vehicle is designed. For example, if the vehicle is to be used on the lunar surface, the frame members may be made from a strong light weight material, such as an alloy of aluminum or titanium.

A plurality of drive units comprising a plurality of split axles 20 are rotatably mounted on frame 12. Each axle 20 extends transversely of frame 12 and is journalled in longitudinal frame members 14 by suitable bearings 24.

A pair of arms 26 are connected to each axle 20, with one arm of each arm pair being connected to each end of the associated axle. The arms 26 of each arm pair extend radially outwardly from the associated axle 20 in opposite directions. A support comprising a stub shaft 28 is connected to the radially outward end of each arm 26 and extends outwardly therefrom substantially parallel to the associated axle 20.

A drive means comprising an electric motor 30 is mounted on each stub shaft 28. A wheel 32 is rotatably mounted on each stub shaft 28 and is disposed about the associated motor 30. Motors 30 are drivingly connected to wheels 32 by any conventional means for rotatably driving the wheels about the axes of stub shafts 28. Motors 30 are independently operable so that wheels 32 may be rotatably driven at different speeds for example in the manner suggested by Le Tourneau et al. U.S. Pat. No. 2,787,331.

Vehicle 10 includes another drive means comprising an electric motor 34 mounted on a pair of supports 36 disposed between and connected to the two central transverse frame members 16. The output shaft of motor 34 is connected to the input shaft of a transmission means 38 by a clutch 40. Transmission means 38 is mounted on a pair of supports 42 also disposed between and connected to the two central transverse frame members 16. Transmission means 38 has a pair of axially aligned output shafts which extend longitudinally of frame 12 in opposite directions. The forwardly extending output shaft of transmission means 38 comprises a forward drive shaft 44 and the rearwardly extending output shaft of the transmission means comprises a rearward drive shaft 48. Forward drive shaft 44 comprises a plurality of shaft portions 52 and universal joints 54 which drivingly connect transmission means 38 to a plurality of forwardly disposed differentials 22. Similarly, rearward drive shaft 48 comprises a plurality of shaft portions 56 and universal joints 58 which drivingly connect transmission means 38 to a plurality of rearwardly disposed differentials 22. Each differential 22 is drivingly connected to one of axles 20. Motor 34 is operable to rotatably drive axles 20 through 360° cycles via clutch 40, transmission means 38, drive shaft 44, drive shaft 48 and differentials 22.

The preferred embodiment of the vehicle of the invention includes six drive units, a triad of which are disposed in the forward portion of frame 12 and a triad of which are disposed in the rearward portion of the frame. To provide vehicle 10 with added stability and to provide clearance between the wheels 32 associated with adjacent drive units, the axle 20 of the central drive unit of each drive unit triad has a greater axial dimension than do the axles of the other two drive units of the same drive unit triad. Also, to provide the vehicle with added stability the arms 26 connected to the longitudinally alternate axles on the same side of frame 12 extend in the same direction, and the arms connected to the longitudinally adjacent axles on the same side of the frame extend in opposite directions.

Vehicle 10 may be propelled in a walking mode, a rolling mode, or a combination walking-rolling mode. The combination mode is illustrated in FIGS. 3A–3C, showing the vehicle traversing moderately rough terrain as would be encountered on portions of the lunar surface. Wheels 32 are individually rotatably driven by motors 30, and axles 20 are rotatably driven by motor 34. As axles 20 are rotated through each 360° cycle, arms 26 and wheels 32 are rotated in a clockwise direction about the axes of the associated axles.

In the preferred six drive unit embodiment of the vehicle of the invention, at any one time there are a minimum of six wheels, three on each side of frame 12, which are in the lower most walking position as shown in FIGS. 3A and 3C. The vehicle will remain stable as long as a minimum of two wheels on each side of the frame are in contact with the ground. Thus, in the preferred embodiment, a minimum stability redundancy of one wheel on each side of the frame is provided. If desired, the vehicle may include a greater or lesser number of drive units, although six such units provide an optimum compromise between stability and weight.

To operate the vehicle in the walking mode, wheels 32 are locked on stub shafts 28 so that the vehicle is propelled by the operation of motor 34 only. Due to the 360° rotation of axles 20, there is no necessity for rotating the wheels at differential speeds in order to maintain traction as in the prior art vehicles. It is preferable to operate the vehicle in the walking mode for traversing relatively rough terrain characterized, for example, by craters having a greater width than the length of the vehicle.

Figure 2:
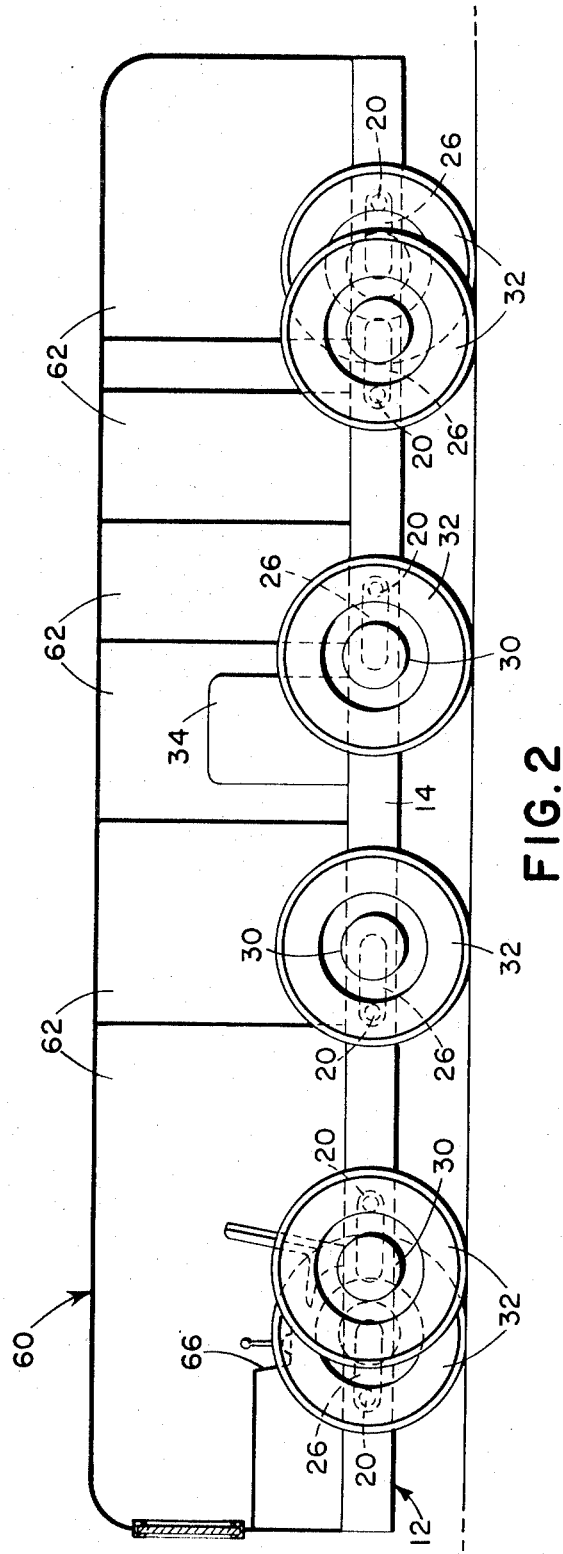
FIG. 2 is an elevational view of the vehicle shown in FIG. 1, further showing one type of body which may be used with the vehicle.

On relatively flat terrain axles 20 may be rotated to the position shown in FIG. 2 with all of arms 26 extending substantially horizontally so that all of wheels 32 are contacting the ground. The axles may be then locked and motors 30 operated to provide a rolling mode of propulsion similar to that achieved by conventional wheeled vehicles.

Vehicle 10 is steered by operating the motors 30 on opposite sides of frame 12 at differential speeds, thus rotating the wheels 32 on opposite sides of frame 12 at differential speeds. Also, if desired, a conventional mechanical steering linkage can be connected to the forwardly disposed drive unit triad. However, for most uses, the vehicle is sufficiently maneuverable by rotating the wheels on opposite sides of the frame at differential speeds.

By employing electric motors 30 and 34 and mechanical elements connecting the motors to wheels 32, vehicle 10 may be used in environments having extreme temperature differentials, such as on the lunar surface. A typical body for the vehicle which is adapted for the use on the lunar surface is shown in FIG. 2, as identified by reference numeral 60. Body 60 includes a plurality of compartments 62 which house motor 34 and the associated electric generating equipment, life support systems, and other equipment desired for lunar excursions. The forward compartment 62 is the control compartment for the vehicle and includes an operator's seat 64 and a control panel 66 from which the operation of the vehicle is controlled.

While the foregoing constitutes a detailed description of the preferred embodiment of the vehicle of the invention it is recognized that various modifications thereof will occur to those skilled in the art. Moreover, while the preferred embodiment has been described as adapted for use on the lunar surface, the vehicle of the invention also may be adapted for use in other environments having rough terrain, such as on the ocean floor and other rocky, sandy and marshy areas of the earth's surface. Therefore, the scope of the invention is to be limited solely by the scope of appended claims.

I claim:

1. A vehicle comprising:
   a frame;

at least two pairs of rotatable drive units mounted on said frame, each of said units being rotatable through 360° and having one end disposed on one side of the frame and the other end disposed on the opposite side of the frame, each of said units including an axle extending transversely of the frame with the ends thereof defining the ends of the associated drive unit, said axles being spaced apart longitudinally of the frame;

a first drive means mounted on said frame and drivingly connected to said axles for rotatably driving said axles through 360°;

a pair of arms connected to each of said axles with one of the arms of each of said arm pairs being connected to each end of the associated axle, the arms of each of said arms pairs extending radially outwardly from the associated axle in opposite directions and the arms connected to longitudinally alternate axles on the same side of the frame extending radially outwardly therefrom in the same direction;

a support connected to each of said arms outwardly from the connection of each of said arms to the associated axle;

a plurality of ground-engaging means, one of said ground engaging means being rotatably mounted on each of said supports; and a plurality of independently operable second drive means, one of said second drive means being drivingly connected to each of said ground-engaging means, whereby the vehicle may be propelled in a walking mode by the operation of said first drive means, in a rolling mode by the operation of said second drive means and in combination walking-rolling mode by the operation of said first and second drive means.

2. A vehicle as recited in claim 1, wherein the arms connected to longitudinally adjacent axles on the same side of the frame extend radially outwardly therefrom in opposite directions.

3. A vehicle as recited in claim 2, wherein one of the axles of each of said drive unit pairs has a greater axial dimension than the other axle of the same drive unit pair.

4. A vehicle as recited in claim 2 comprising two triads of said drive units; and wherein one of the axles of each of said drive unit triads has a greater axial dimension than the other two axles of the same drive unit triad.

5. A vehicle as recited in claim 1, wherein said first drive means comprises an electric motor, a transmission means connected to said motor, a drive shaft connected to said transmission means and a plurality of differentials connecting said drive shaft to said drive units.

6. A vehicle as recited in claim 1; wherein each of said second drive means comprises an electric motor, one of said motors being mounted on each of said supports; and wherein one of said ground-engaging means is disposed about each of said motors.

7. A vehicle as recited in claim 1, wherein each of said ground-engaging means comprises a wheel.

* * * * *